March 13, 1951  C. D. NUGENT  2,545,374
TWO-STAGE FILTER IN SINGLE HOUSING
Filed Aug. 11, 1949  2 Sheets-Sheet 1

Inventor
Corliss D. Nugent
by Parker & Carter
Attorneys.

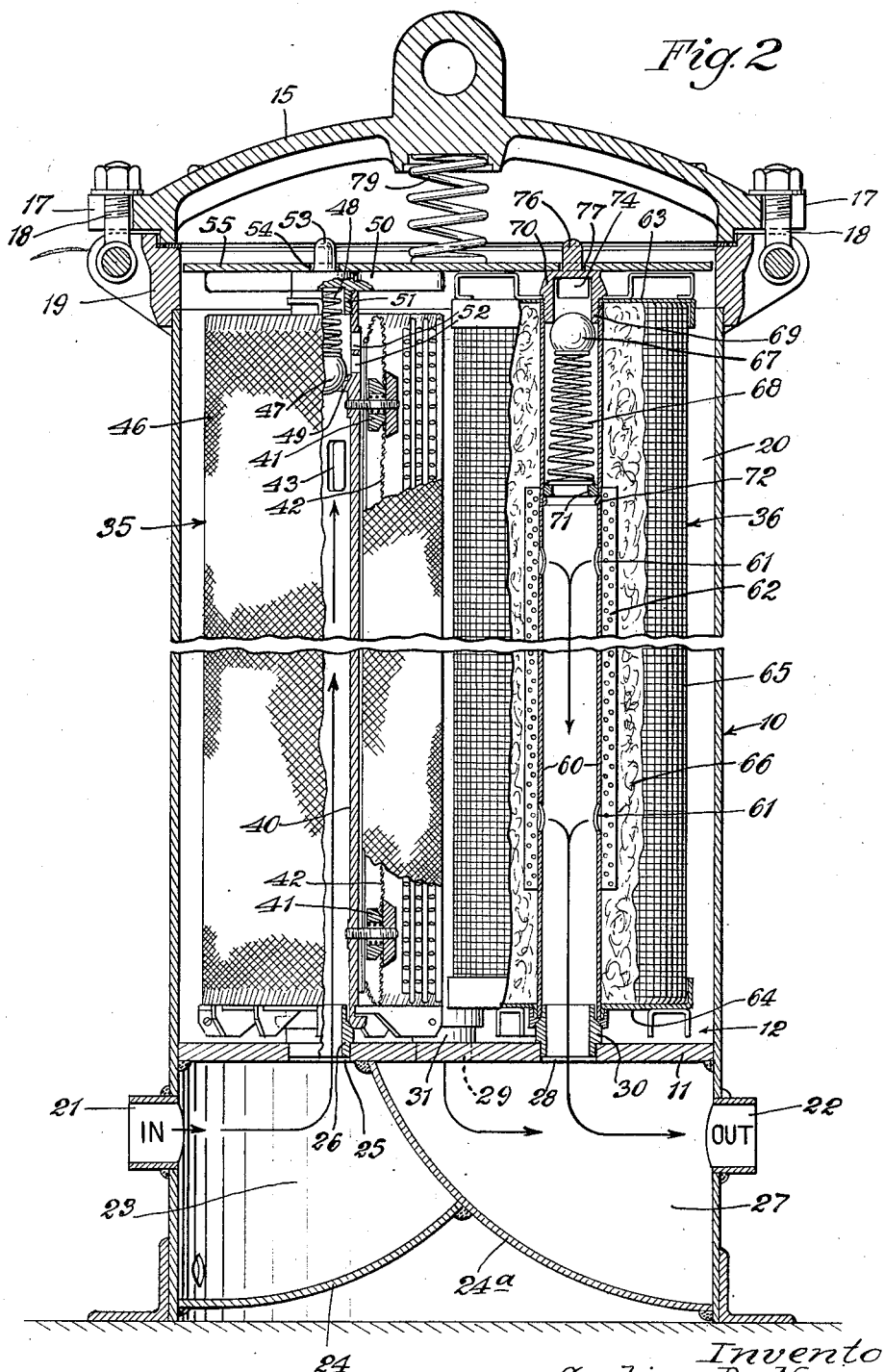

Patented Mar. 13, 1951

2,545,374

UNITED STATES PATENT OFFICE 2,545,374

TWO-STAGE FILTER IN SINGLE HOUSING

Corliss D. Nugent, Winnetka, Ill., assignor to Wm. W. Nugent & Co., Inc., Chicago, Ill., a corporation of Illinois Application August 11, 1949, Serial No. 109,745

4 Claims. (Cl. 210—184)

This invention relates to improvements in pressure filters of the kind especially adapted for oil filtering systems, although not necessarily limited to the filtering of oil.

More particularly, the invention relates to two-stage filters having a plurality of removable filter elements for both coarse and fine filtering, mounted on a single filter casing.

The principal object of the present invention is to provide an improved filter consisting of a single casing containing a plurality of removable filter units arranged in series, for filtering both coarse and fine liquid, with bypass means in the finer filtering units, to permit the bypassing of liquid around the latter under conditions where the flow of fluid through the coarse filtering unit may overtax the capacity of one or more of the fine filtering units in the series therewith.

Other objects of the invention will appear from the following description.

The invention may best be understood by reference to the accompanying drawings, in which:

Figure 2 is a sectional view, taken on line 2—2 of Figure 1, with the central portion of the filter casing broken away.

Figure 1:
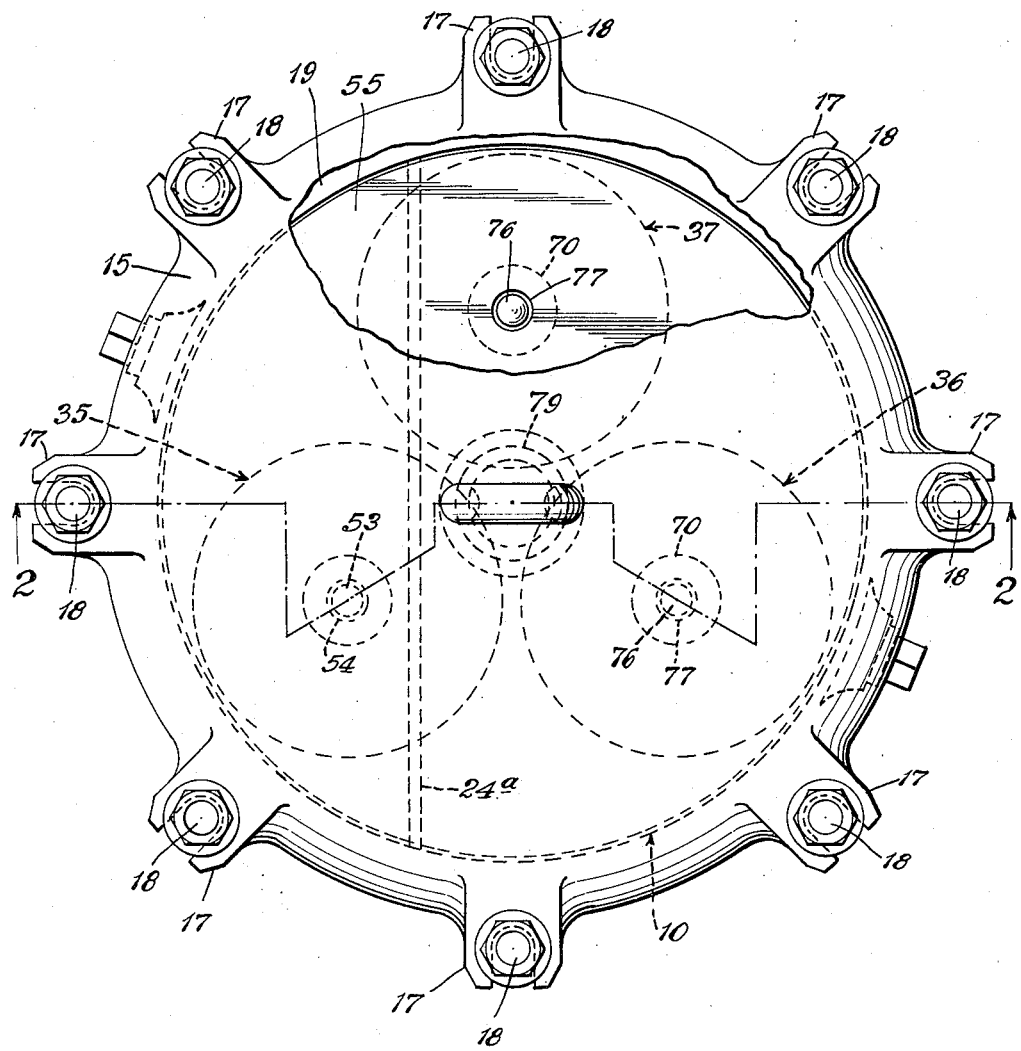
Figure 1 is a plan view of a filter casing constructed in accordance with my invention.

Referring now to details of the embodiment of my invention shown in the drawings, a single casing, herein cylindrical in form, is indicated generally at 10. It is provided with a transverse partition 11, suitably fixed as by welding to the side walls of the casing and forming the bottom of a filtering chamber 12 within the casing. The casing is provided with a removable cover 15, having a plurality of peripheral lugs 17, slotted outwardly for receiving bolts 18 pivotally mounted on a ring 19 surrounding the upper edge of the casing. When in closed position, the cover 15 seals the main filtering compartment 20 within the casing 10.

At the bottom of the casing is an inlet 21 and an outlet 22. The inlet communicates with an interior compartment 23 partially defined by a bottom wall 24 and, in turn, communicating with a filtering compartment 20 through an aperture 25 in the partition 11. An upstanding nipple 26 is fixed in the aperture 25, said nipple being adapted for receiving one of the filtering elements in seated position thereon, as will presently appear. The outlet 22 communicates with an interior compartment 27, partially defined by a bottom wall 24a, below the transverse partition 11 and, in turn, communicates with a plurality of apertures 28 and 29 in said bottom partition. Upstanding nipples 30 and 31 may be similar to the nipple 26 previously mentioned as communicating with the inlet 21 and are also adapted for receiving detachable filter units in seated engagement therewith, as will presently appear.

It will now be understood from the above description that the inlet communicates with one upstanding inlet nipple leading into the main filtering compartment 20, while the two upstanding nipples 30 and 31 afford communication from the main filtering compartment 20 to the outlet 22.

Referring now to the filtering units which are detachably mounted within the main filtering compartment 20, a relatively coarse filtering unit, indicated generally at 35, is detachably connected at its inlet end to the single inlet nipple 26, while two other filtering units 36 and 37, both defined for much finer filtering action than the coarse filter unit 35, are detachably connected at their outlet ends to the outlet nipples 30 and 31 respectively.

In the form of coarse filter unit 35 shown herein, I have shown for illustrative purposes a so-called bag-type filter unit of the kind which has gone into extensive use in single filters for relatively coarse filtering and is broadly disclosed in prior Patents No. 1,909,308 and No. 1,918,980. Since these bag-type filter units are well known in the art, detailed description should not be necessary, excepting to point out the main elements of the bag-type filter unit as follows:

The filter unit 35 is built around a central tubular member 40, to which is connected as by threaded lugs 41, 41 a plurality of flat fabric bags 42 which are wound spirally around the central tubular member 40. The central tubular member 40 has one or more outlets 43 communicating with the open ends of the several bags, so that the liquid to be filtered normally flows from the central tubular member outwardly through the fabric walls of the latter in the usual manner. The bags are usually enclosed in an outer mesh cover 46 of fabric or wire so that the filtering unit is maintained in generally cylindrical form.

The filtering unit 35 also has a built-in bypass valve, herein consisting of a ball 47 urged by a coil spring 48 against a restricted seat 49 near the upper end of the tubular member 40. The extreme upper end of the tubular member 40 is closed as by a handle 50, having a depending hollow boss 51 threaded into the upper end of the tubular member and forming an abutment for the upper end of the coil spring 48. Liquid bypassed through the ball valve 47 escapes through apertures 52, 52 disposed above the bags 42 so that in the present form of apparatus any by-passed liquid enters directly into the main filtering compartment 20.

An upstanding stud 53 is axially disposed on the upper face of the handle 50 and extends through an aperture 54 in a pressure plate 55, which holds all the filter units in place, as will presently appear.

The fine filter units 36 and 37 are both of the same construction, designed to give much finer filtering effect to the liquid bypassed therethrough. In the form shown herein, each of the fine filter units is of the kind which has gone into extensive use in single filters and is broadly disclosed in my prior Patent No. 2,352,732. Such fine filter units are usually packed with relatively dense filtering material designed to have a much finer filtering action upon liquid passing therethrough than is the case with the bag-type filter hereinabove described. Since these relatively fine filter units are also well known in the art, detailed description should not be necessary, excepting to point the main elements of the units as follows:

The fine filtering units are each built around a central tubular member 60 extending axially thereof and having a plurality of apertures 61, 61 therealong communicating with an outwardly flanged straining sleeve 62 surrounding the central portion of the tube 60. Flanged upper and lower end plates 63 and 64 are connected at opposite ends of the tube 60 and a perforate container, herein consisting of a cylindrical wire screen 65, has its upper and lower ends fitted in the flanged end plates 63, 64 to form a cylindrical compartment filled with suitable filtering material 66.

Each of the filtering units 36 and 37 has a bypass valve, herein consisting of a ball 67 urged by a coil spring 68 upwardly against a restricted seat 69 formed by a thimble 70 threaded into the upper end of the tube 60. The lower end of the coil spring 68 abuts against a disc 71 which engages a reduced shoulder 72 in the tube 60. The thimble 70 is closed at its upper end but is provided with one or more apertures 74 in the side wall thereof above the end of the tube 60, so as to provide communication between the interior of the main filtering chamber 20 and the bypass ball valve 67.

An upstanding stud 76 is formed integrally with the top of the thimble 70 and extends through an aperture 77 in the pressure plate 55 to form a centering member substantially similar to the stud 53 of the coarser filtering unit 35.

The length of the coarse filtering unit 35, including its central tubular member 40 and its top handle 50, is the same as the length of the two finer filtering units 36 and 37, with their central tubes 60 and their top thimbles 70, so that the pressure plate 55 is adapted to fit flatwise over all three of the filtering units 35, 36 and 37 and hold them by compression of a single centrally disposed spring 79 abutting against the under face of the cap 15 so as to urge the lower ends of their central tubes in seated relation against their respective nipples 25, 30 and 31 on the lower partition 11.

The use and operation of the apparatus I have been describing are as follows:

Liquid entering the inlet 21 is led upwardly through the central tube 40 of coarse filtering unit 35 and thence through the several filtering bags 42, outwardly into the main filtering chamber 20 of casing 10. From the filtering chamber 20 the liquid will normally be passed in a divided stream through the filtering media of the two fine filtering units 36 and 37 into the two tubular members 60 of said last-named filtering units, and thence downwardly to the outlet 22 of the casing.

It will be understood that the capacity of a coarse filter unit 35, such as the bag type herein disclosed is usually greatly in excess of the finer filter units 36 and 37. Therefore, in the form of apparatus shown herein, at least two of the finer filter units are required to take care of the liquid filtered through the coarse unit 35. In fact, under ordinary conditions, finer filtering units of the kind contemplated usually have less than one-half the capacity of a single coarse filtering unit, even when the filtering units are new. Consequently, the self-contained bypass valves 67 in each of the fine filtering units 36 and 37 are provided to take care of excessive pressure which may be built up within the main filtering compartment 20 from time to time during the use of the filtering apparatus.

Moreover, it will be understood that the finer filtering units 36 and 37 have a greater tendency to collect sediment and become clogged during continued use than the bag type element filtering unit 35. The bypass valves 67 in the fine filtering units, therefore, become of increasing importance during extended use of the apparatus, in order to insure continued flow through the system of oil, when one or more of the finer filtering units may be bypassed during times of excessive pressure thereon, or even become fully inoperative due to clogging.

Although the coarse filter unit 35 is also provided with a self-contained bypass valve 47, it will be understood that this last-named bypass valve is ordinarily set for operation at a substantially higher pressure than the bypass valves 67 in the fine filter units 36 and 37. Since the capacity of the coarse filtering unit 35 is usually greater than both fine filtering units 36 and 37, the bypass valve 47 is provided primarily as a safety precaution, only in case of practically complete clogging of the coarse filtering unit 35 long after the latter unit should properly have been replaced in the filtering system. The necessity of replacing overclogged filter units may be noted, as usual, by pressure readings in the system, or by visual inspection of the liquid output from the filter.

When it is desired to remove the several filtering units for inspection or replacement, the cap 15 is removed from the casing 10. This permits bodily removal of the pressure plate 55 which holds all the filter units, both coarse and fine, in seated engagement on the respective nipples 25, 30 and 31, so that any or all the filter units can be quickly removed from the casing as desired.

From the above description, it will now be understood that I provide a single filter casing containing a plurality of removable filter units for filtering liquids in both coarse and fine degree, wherein all of the liquid normally is passed first through the coarse filtering unit and then through a plurality of fine filtering units, under conditions where the capacity of the fine filtering units may not be sufficient to take care of all the liquid passed through the coarse filtering unit. Self-contained by-pass means are provided in the finer filtering units to insure a continuous flow of liquid through the apparatus.

It will be observed further that the liquid will be passed in series from the coarse filtering unit into the main filtering compartment 20 and from thence in parallel through a plurality of fine filtering units to the outlet. Nevertheless, all the filtering units, both coarse and fine, are detachably retained by single retaining means so that they can be readily removed for replacement or repair.

Although I have shown and described a practical and operative device, obviously other changes could be made in my invention by those skilled in the art to which invention pertains and, therefore, I do not wish to be limited as set forth in the appended claims.

I claim:

1. In a two-stage filter, a hollow casing having an inlet and an outlet, a plurality of filtering units adapted for detachable mounting therein, one of which said filtering units being for coarse filtering, and a plurality of other units being for fine filtering, the coarse filter unit having a centrally disposed tubular member opening at one end thereof directly connected in detachable relation to the inlet of said casing, and the fine filtering units each having a centrally disposed tubular member opening at one end thereof directly connected in detachable relation with the outlet of said casing, so that all the incoming liquid will normally pass through the coarse filter and then pass in divided paths through the fine filter units, each of said filter units being detachable and removable from said casing independently of the other units, and the tubular members of each of said fine filter units including self-contained bypass means for bypassing liquid under predetermined pressure from said coarse filter unit to the outlet.

2. A filter in accordance with claim 1, wherein the casing has a transverse partition at the bottom thereof, and communication with the inlet and outlet of said casing is through a plurality of nipples mounted on said partition and the tubular members of said coarse and fine filter units respectively, having seating connection at their lower ends with their respective nipples, and means are provided in said casing for detachably engaging the opposite ends of said filter units, and holding the ends of said tubular members in seated relation with their respective nipples.

3. A filter in accordance with claim 1, wherein the casing has a transverse partition at the bottom thereof, and communication with the inlet and outlet of said casing is through a plurality of nipples mounted on said partition and the coarse and fine filter units each include tubular center members surrounded by filtering material, said tubular members adapted to have seating connection at their lower ends with their respective nipples, said tubular members having positioning members at their upper ends, and a spring-pressed pressure plate in the upper end of said casing having interfitting engagement with the upper ends of said positioning members of said filtering units for detachably holding said filter units in said casing with the lower ends of their tubular members in seated relation with their respective nipples.

4. In a filter in accordance with claim 3, wherein the casing has a removable cover plate at its upper end separate from said pressure plate with spring means interposed between said cover and said pressure plate when the cover is secured to the casing.

CORLISS D. NUGENT.

REFERENCES CITED

The following references are of record in the file of this patent:

UNITED STATES PATENTS

| Number | Name | Date |
|---|---|---|
| 420,136 | Willis | Jan. 28, 1890 |
| 654,592 | Barr | July 31, 1900 |
| 1,906,417 | Renfrew et al. | May 2, 1933 |
| 1,909,308 | Nugent | May 16, 1933 |
| 1,918,980 | Nugent | July 18, 1933 |
| 2,098,725 | Hurn | Nov. 9, 1937 |
| 2,352,732 | Nugent | July 4, 1944 |
| 2,440,487 | Rayburn | Apr. 27, 1948 |
| 2,447,680 | Bauer | Aug. 24, 1948 |

FOREIGN PATENTS

| Number | Country | Date |
|---|---|---|
| 118,713 | Australia | Feb. 25, 1943 |